United States Patent [19]

Müller

[11] Patent Number: 5,226,503
[45] Date of Patent: Jul. 13, 1993

[54] ARRANGEMENT FOR THE OPERATING OF CLUTCHES OF AN ALL-WHEEL TRANSMISSION LINE

[75] Inventor: Robert Müller, Mönsheim, Fed. Rep. of Germany

[73] Assignee: Dr. Ing. h.c.F. Porsche AG, Fed. Rep. of Germany

[21] Appl. No.: 716,282

[22] Filed: Jun. 17, 1991

[30] Foreign Application Priority Data

Jun. 21, 1990 [DE] Fed. Rep. of Germany ....... 4019763

[51] Int. Cl.⁵ .............................................. B60K 17/35
[52] U.S. Cl. ..................................... 180/249; 180/248; 180/244; 192/87.11
[58] Field of Search ................ 180/249, 244, 247, 248, 180/250, 233; 192/87.11, 87.13; 475/116, 127, 140

[56] References Cited

U.S. PATENT DOCUMENTS

| | | | |
|---|---|---|---|
| 3,365,985 | 1/1968 | Johnson | 192/87.11 X |
| 3,384,214 | 5/1968 | Wilson | 192/87.11 |
| 4,237,749 | 12/1980 | Koivunen | 192/87.11 X |
| 4,484,654 | 11/1984 | Hayakawa | 180/248 X |
| 4,862,768 | 9/1989 | Iwatsuki et al. | 180/249 X |

FOREIGN PATENT DOCUMENTS

| | | |
|---|---|---|
| 0076148 | 4/1983 | European Pat. Off. . |
| 3212495 | 10/1983 | Fed. Rep. of Germany . |
| 3446460 | 7/1986 | Fed. Rep. of Germany . |
| 61-89126 | 7/1986 | Japan . |

Primary Examiner—David M. Mitchell
Assistant Examiner—Peter C. English
Attorney, Agent, or Firm—Evenson, McKeown, Edwards & Lenahan

[57] ABSTRACT

An arrangement for the operating of clutches of an all-wheel transmission line has two hydraulically operated clutches inserted in the transmission line of a motor vehicle. The first clutch is used as the separating clutch to a first vehicle axle; the second clutch is used as a locking clutch for the blocking of a lock system by which the second vehicle axle can be connected as a function of the rotational speed. The separating clutch can be closed against the force of a diaphragm spring by a first hydraulic piston with a second hydraulic piston, which is concentric with respect to the first hydraulic piston, the locking clutch can be opened against the force of a diaphragm spring.

11 Claims, 2 Drawing Sheets

ARRANGEMENT FOR THE OPERATING OF CLUTCHES OF AN ALL-WHEEL TRANSMISSION LINE

BACKGROUND AND SUMMARY OF THE INVENTION

The invention relates to an arrangement for the hydraulic operating of two clutches mounted in an all-wheel transmission line of a motor vehicle, the first clutch serving as a separating clutch in the transmission line to a first vehicle axle, the second clutch serving as the locking clutch for the blocking of a locking system by means of which the second vehicle axle, as a function of the rotational speed difference, can be connected between the two vehicle axles.

In the German Patent Document DE-PS 32 12 495, a hydraulic operation of a multi-plate clutch is described in which a differential gearing in the transmission line of a motor vehicle can be locked. For this purpose, a hydraulic piston, which is acted upon by pressure and by way of an engaging bearing on the interior, acts upon a diaphragm spring which is supported in the housing on the outer edge. A pressure piece guided in the housing rests against the diaphragm spring. When the diaphragm spring is braced, the plates can be brought into frictional engagement with the pressure piece.

An object of the present invention is to provide a clutch operation for an all-wheel drive of the above-mentioned type which requires little space and permits a safe operation of the motor vehicle even when the electronic all-wheel control fails or is impaired.

This and other objects are achieved by an arrangement for operating two clutches mounted in an all-wheel transmission line of a motor vehicle that has first and second vehicle axles, the arrangement comprising a separating clutch in the transmission line to the first vehicle axle, and a locking clutch for the blocking of a locking system by which the second vehicle axle is connected as a function of the rotational speed difference of the first and second vehicle axles. A first spring biases the separating clutch, while a second spring biases the locking clutch. A first hydraulic piston is coupled to the separating clutch and closes the separating clutch against the force of the first spring. A second hydraulic piston is coupled to the locking clutch and opens the locking clutch against the force of the second spring.

Since a locking clutch is provided, which is used for the blocking of the locking system for the front axle and which is held in the closed position by means of a spring, the locking clutch can be opened only by the application of hydraulic pressure. Even in the case of a failure of the all-wheel function, the front axle is therefore driven by means of a purely mechanical connection. In this case, the separating clutch to the rear axle is open and the drive to the rear axle is stopped. This is an important prerequisite for an ABS-system to become effective and for a stable driving operation also during braking.

In an advantageous embodiment of the present invention, two hydraulic pistons are provided as the hydraulic operating device. These hydraulic pistons are concentric with respect to one another and are guided in one another in a sealed manner so that an extremely space-saving construction is achieved.

Other objects, advantages and novel features of the present invention ill become apparent from the following detailed description of the invention when considered in conjunction with the accompanying drawings.

DETAILED DESCRIPTION OF THE DRAWINGS

Figure 1:
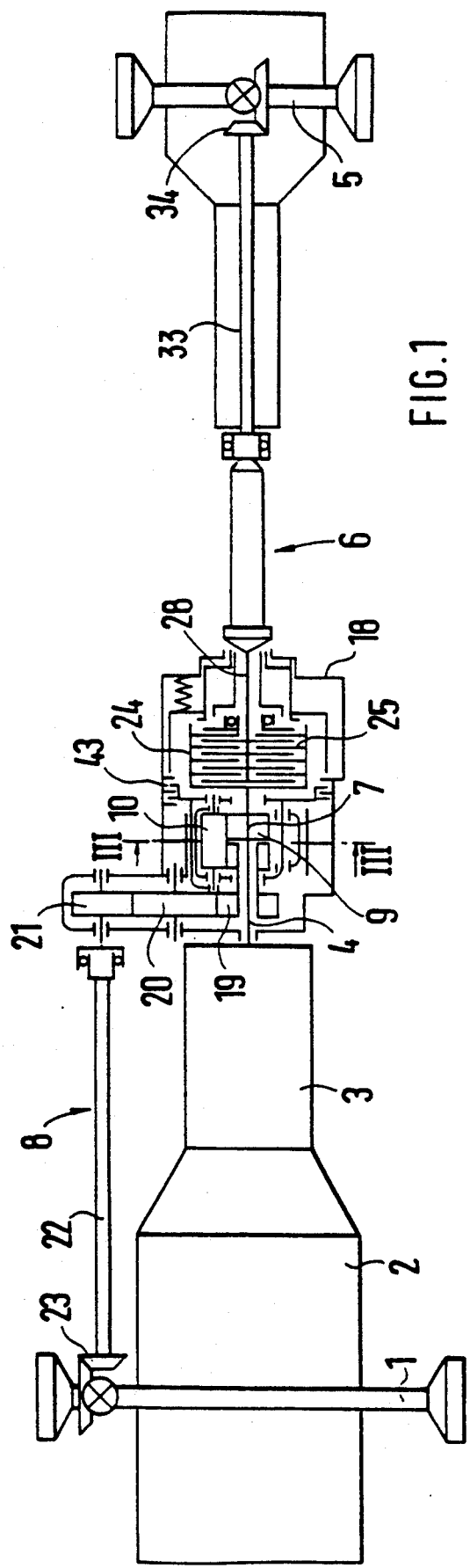
FIG. 1 is a schematic all-wheel driving system of a motor vehicle constructed in accordance with an embodiment of the present invention.

An engine 2, which is arranged close to the front axle 1 on a motor vehicle, by means of a change-speed gearbox 3 and a drive shaft 4, drives a first transmission line 6 leading to the rear axle 5 and a transmission line 8 to the front axle 1 which is connected to the first transmission line at a branch-off point 7. A serrated coupling is used as the branch-off point 7, with which an input sun gear 9 of a planet gear locking system 10 is non-rotatable on the drive shaft 4. Coaxially with respect to the input sun gear 9, and adjacent to it, an output sun gear 11 with a slightly smaller number of teeth is disposed on the drive shaft 4 by a needle bearing 12.

The output sun gear 11 is constructed in one piece with a hollow output shaft 13 which, on its exterior side, is disposed in a forward bearing housing 16 by means of a ball bearing 15. The bearing housing 16, a lock housing 17 and a hydraulic housing 18 together form a housing enclosing the all-wheel driving device, the three housing parts 16, 17, 18 being centered with respect to one another and being fastened to one another in a sealed manner.

Approximately in the center between the needle bearing 12 and the ball bearing 15, a toothed wheel 19 is fastened on the output shaft 13, this toothed wheel 19, by means of an idler gear 20, driving a toothed wheel 21 of an output shaft 22 which drives the front axle 1 via a bevel gear angle drive 23.

On the shaft end of the drive shaft 4, which is disposed behind the branch-off point 7, a clutch housing 24 is non-rotatably fixed by means of a serrated coupling and encloses a separating clutch 25 for the first transmission line 6. Outer plates 26 are non-rotatable and longitudinally slidable in the clutch housing 24. They interact with inner plates 27 which are non-rotatable on a plate carrier 28' connected with the output shaft 28 to the rear axle 5. The output shaft 28 has a hollow construction and is disposed in bearing 30 of the hydraulic housing 18. The drive shaft 4, by means of two needle bearings 31, 32, is disposed in the output shaft 28. By way of a propeller shaft 33 and a bevel gear angle drive 34, the output shaft 28 drives the rear axle 5.

Figure 3:
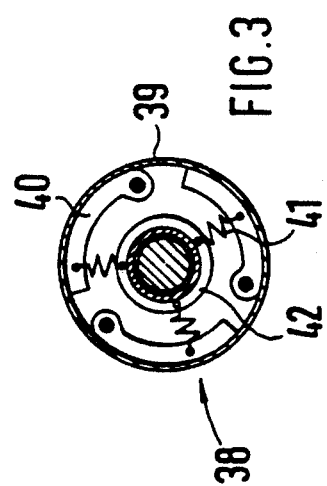
FIG. 3 is a view of the centrifugal brake of the planet gear locking system.
Figure 2:
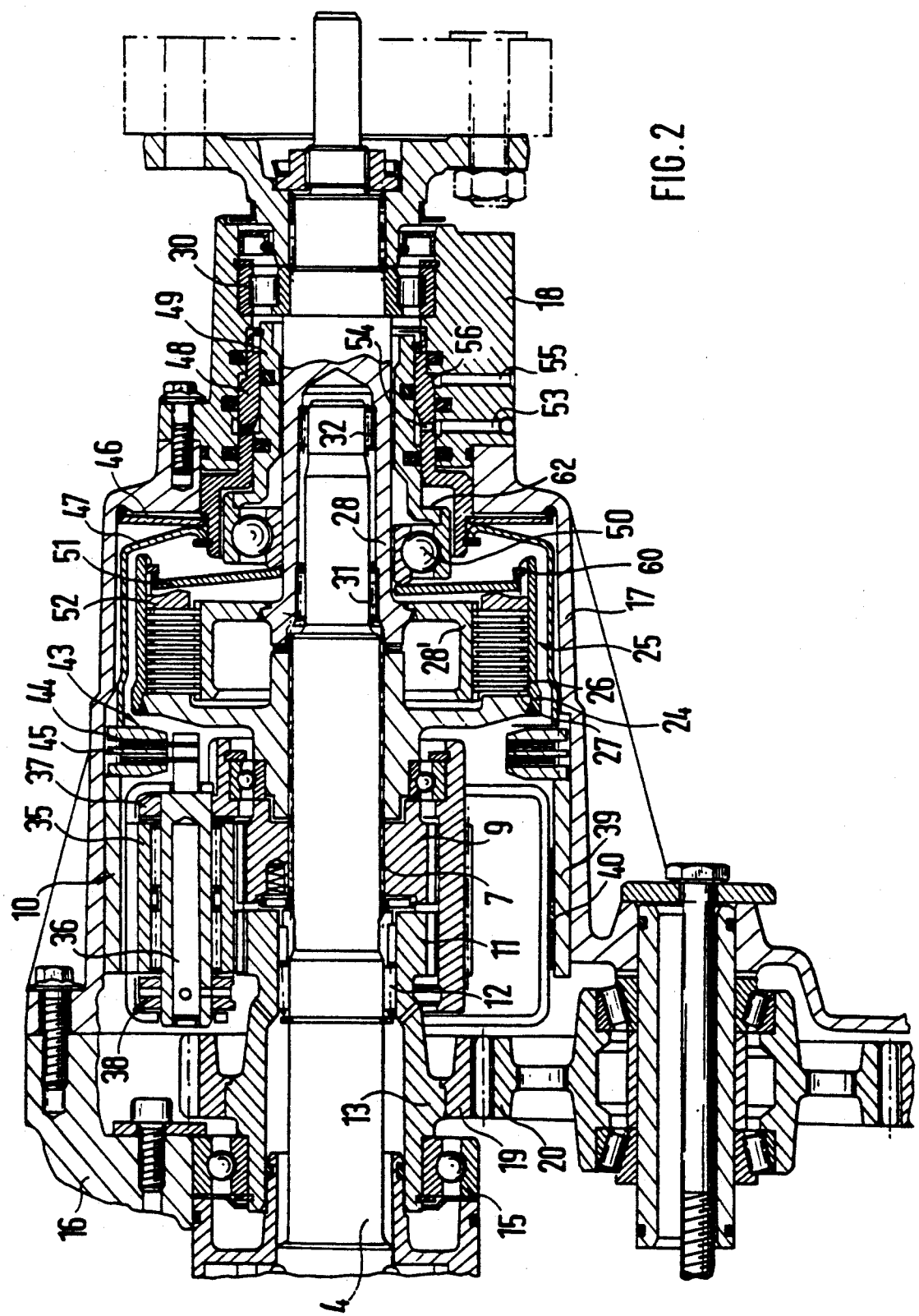
FIG. 2 is a longitudinal sectional view of the transmission lines to the front axle and to the rear axle with the hydraulic operating device of the present invention.

Three planet gears 35 engage with the input sun gear 9 and the output sun gear 11, the planet gears 35 being disposed in bearing brackets 36 of the planet carrier 37. A centrifugal brake 38, which is shown in detail in FIG. 3, is mounted on one group of ends of the bearing brackets 36. By means of centrifugal force, the brake shoes 40, which rotate along with the planet carrier 37 and can be swivelled on the bearing brackets 36, are pressed onto a stationary brake drum 39 of the lock housing 17. Tension springs 41 act against the centrifugal force by means of Which the brake shoes 40 are linked to a central hollow-drilled brake shaft 42 rotating along with the planet carrier 37.

The input sun gear 9 has a tooth number Z=47; the output sun gear 11 has a tooth number Z=44. The ratio from the input sun gear 9 to the planet carrier 37 is 15⅔: 1. When a rotational speed difference occurs between the drive shaft 4 and the output shaft 13, the planet carrier 37 and the brake shoes 40 are set into rotation with a ratio of 15⅔ with respect to the differential number of rotations. The brake shoes 40 build up a locking moment which rises proportionally with the rotational speed difference.

On the other ends of the bearing pins 36, a locking clutch 43 is disposed in order to prevent, in the case of certain driving conditions, the rotating of the planet carrier 37 and to implement a rigid driving connection between the front axle 1 and the rear axle 5. Inner plates 44 are fastened on the bearing pins 36. They interact with the outer plates 45 of the lock housing 17. The locking clutch 43 is closed by means of a diaphragm spring 46 which is supported between the hydraulic housing 18 and an operating bell 47. It is opened against the force of the diaphragm spring 46 by means of an outer hydraulic piston 48 which is longitudinally guided in the hydraulic housing 18. An inner hydraulic piston 49, which is guided in the hydraulic 1 housing 18, actuates a diaphragm spring 51 via an engaging bearing 50, and a pressure piece 5 actuates the separating clutch 25. The outer edge of the diaphragm spring 51 is held between the pressure piece 52 and an O-ring 60 that rests against the clutch housing 24. The locking clutch 43 is closed by spring force in an unpressurized manner and the separating clutch 25 is opened in an unpressurized manner.

In the normal operating condition, via the pressure connection 53 and radial ducts 54, the inner hydraulic piston 49 is displaced to the left and the outer hydraulic piston 48 is displaced to the right so that the separating clutch 25 is closed and the power flux is therefore established to the rear axle. At the same time, by means of the outer hydraulic piston 48, the locking clutch 43 is released and thus the planet carrier 35 of the all-wheel locking system is released.

In the ABS-operation as well as during towing and during performance testing of the motor vehicle, the pressure connection 53 is unpressurized; the separating clutch 25 is open; the locking clutch 43 is closed. Thus the rear axle 5 is disconnected and the front axle 1 is rigidly connected with the engine 2.

If, at the same time, with the admission of pressure to the pressure connection 53, the same pressure is also fed to the pressure connection 55, the outer hydraulic piston 48, because of its larger hydraulic application surface 56, is displaced to the left. The inner hydraulic piston 49 has a shoulder 62. The outer hydraulic piston 48 is movable against this shoulder 62 when the outer hydraulic piston 48 is acted upon by the hydraulic pressure. In this way, the inner hydraulic piston 49 and the outer hydraulic piston 48 are actuated at the same time. The locking clutch 43 is closed without any disconnecting of the rear axle 5. A rigid drive is then provided to both the front axle and to the rear axle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for operating two clutches mounted in an all-wheel transmission line of a motor vehicle that has first and second vehicle axles, comprising:
    a separating clutch in the transmission line to the first vehicle axle;
    a locking clutch for the blocking of a locking system by which the second vehicle axle is connected as a function of the rotational speed difference of a drive shaft and an output shaft;
    a first spring which biases the separating clutch;
    a second spring which biases the locking clutch;
    a first hydraulic piston coupled to the separating clutch which closes the separating clutch against the force of the first spring;
    a second hydraulic piston coupled to the locking clutch which opens the locking clutch against the force of the second spring; and
    a hydraulic housing in which the first and second hydraulic pistons are arranged concentrically with respect to one another and are guided in a sealed manner,
    wherein the first hydraulic piston is an inner piston and the second hydraulic piston is an outer piston, and the inner hydraulic piston is guided in a sealed manner in the outer hydraulic piston,
    wherein the outer hydraulic piston has radial ducts through which hydraulic pressure acts upon the inner hydraulic piston.

2. An arrangement according to claim 1, further comprising an output shaft coupled between the locking clutch and the second axle and having an engaging bearing slidable received on said output shaft, ad a clutch housing that houses the separating clutch and supports the first spring, wherein the inner hydraulic piston acts upon the separating clutch via the engaging baring and the first spring.

3. An arrangement according to claim 2, further comprising a pressure piece and an O-ring resting against the clutch housing, wherein an outer edge of the first spring is held between the pressure piece and the O-ring.

4. An arrangement for operating two clutches mounted in an all-wheel transmission line of a motor vehicle that has first and second vehicle axles, comprising:
    a separating clutch in the transmission line to the first vehicle axle;
    a locking clutch for the blocking of a locking system by which the second vehicle axle is connected as a function of the rotational speed difference of a drive shaft and an output shaft;
    a first spring which biases the separating clutch;
    a second spring which biases the locking clutch;
    a first hydraulic piston coupled to the separating clutch which closes the separating clutch against the force of the first spring;
    a second hydraulic piston coupled to the locking clutch which opens the locking clutch against the force of the second spring; and
    a hydraulic housing in which the first and second hydraulic pistons are arranged concentrically with respect to one another and are guided in a sealed manner;
    wherein the first hydraulic piston is an inner piston and the second hydraulic piston is an outer piston, and the inner hydraulic piston is guided in a sealed manner in the outer hydraulic piston;

wherein the inner hydraulic piston has a shoulder, with the outer hydraulic piston being movable against said shoulder when the outer hydraulic piston is acted upon by the hydraulic pressure, such that the inner hydraulic piston and the outer hydraulic piston are actuated at the same time;

further comprising an output shaft coupled between the locking clutch and the second axle and having an engaging bearing slidable received on said output shaft, and a clutch housing that houses the separating clutch and supports the first spring, wherein the inner hydraulic piston acts upon the separating clutch via the engaging bearing and the first spring.

5. An arrangement according to claim 4, further comprising a pressure piece and an O-ring resting against the clutch housing, wherein an outer edge of the first spring is held between the pressure piece and the O-ring.

6. An arrangement for operating two clutches mounted in an all-wheel transmission line of a motor vehicle that has first and second vehicle axles, comprising:

a separating clutch in the transmission line to the first vehicle axle;

a locking clutch for the blocking of a locking system by which the second vehicle axle is connected as a function of the rotational speed difference of a drive shaft and an output shaft;

a first spring which biases the separating clutch;

a second spring which biases the locking clutch;

a first hydraulic piston coupled to the separating clutch which closes the separating clutch against the force of the first spring;

a second hydraulic piston coupled to the locking clutch which opens the locking clutch against the force of the second spring; and a hydraulic housing in which the first and second hydraulic pistons are arranged concentrically with respect to one another and are guided in a sealed manner;

wherein the first hydraulic piston is an inner piston and the second hydraulic piston is an outer piston, and the inner hydraulic piston is guided in a sealed manner in the outer hydraulic piston;

further comprising an output shaft coupled between the locking clutch and the second axle and having an engaging bearing slidable received on said output shaft, and a clutch housing that houses the separating clutch and supports the first spring, wherein the inner hydraulic piston acts upon the separating clutch via the engaging bearing and the first spring.

7. An arrangement according to claim 6, further comprising a pressure piece and an O-ring resting against the clutch housing, wherein an outer edge of the first spring is held between the pressure piece and the O-ring.

8. An arrangement for operating two clutches mounted in an all-wheel transmission line of a motor vehicle that has first and second vehicle axles, comprising:

a separating clutch in the transmission line to the first vehicle axle;

a locking clutch for the blocking of a locking system by which the second vehicle axle is connected as a function of the rotational speed difference of a drive shaft and an output shaft;

a first spring which biases the separating clutch;

a second spring which biases the locking clutch;

a first hydraulic piston coupled to the separating clutch which closes the separating clutch against the force of the first spring;

a second hydraulic piston coupled to the locking clutch which opens the locking clutch against the force of the second spring; and a hydraulic housing in which the first and second hydraulic pistons are arranged concentrically with respect to one another and are guided in a sealed manner;

further comprising an output shaft coupled between the locking clutch and the second axle and having an engaging bearing slidably received on said output shaft, and a clutch housing that houses the separating clutch and supports the first spring, wherein the first hydraulic piston acts upon the separating clutch via the engaging bearing and the first spring.

9. An arrangement according to claim 8, further comprising a pressure piece and an O-ring resting against the clutch housing, wherein an outer edge of the first spring is held between the pressure piece an the o-ring.

10. An arrangement for operating two clutches mounted in all-wheel transmission line of a motor vehicle that has first and second vehicle axles, comprising:

a separating clutch in the transmission line to the first vehicle axle;

a locking clutch for the blocking of a locking system by which the second vehicle axle is connected as a function of the rotational speed difference of a drive shaft and an output shaft;

a first spring which biases the separating clutch;

a second spring which biases the locking clutch;

a first hydraulic piston coupled to the separating clutch which closes the separating clutch against the force of the first spring;

a second hydraulic piston coupled to the locking clutch which opens the locking clutch against the force of the second spring; and an output shaft coupled between the locking clutch and the second axle and having an engaging bearing slidable received on said output shaft, and a clutch housing that houses the separating clutch and supports the first spring, wherein the first hydraulic piston acts upon the separating clutch via the engaging bearing and the first spring.

11. An arrangement according to claim 10, further comprising a pressure piece and an O-ring resting against the clutch housing, wherein an outer edge of the first spring is held between the pressure piece and the O-ring.

* * * * *